US012696306B2

(12) United States Patent (10) Patent No.: US 12,696,306 B2
Wilhelmsson et al. (45) Date of Patent: Jul. 28, 2026

(54) CONTROL OF WIRELESS SENSING DEVICES

(71) Applicant: Telefonaktiebolaget LM Ericsson (publ), Stockholm (SE)

(72) Inventors: Leif Wilhelmsson, Lund (SE); Miguel Lopez, Aachen (DE); Hugo Tullberg, Nyköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 430 days.

(21) Appl. No.: 18/264,108

(22) PCT Filed: Feb. 12, 2021

(86) PCT No.: PCT/EP2021/053503
§ 371 (c)(1),
(2) Date: Aug. 3, 2023

(87) PCT Pub. No.: WO2022/171297
PCT Pub. Date: Aug. 18, 2022

(65) Prior Publication Data
US 2024/0129949 A1     Apr. 18, 2024

(51) Int. Cl.
*H04W 72/542* (2023.01)
*H04W 72/04* (2023.01)
*H04W 84/12* (2009.01)

(52) U.S. Cl.
CPC ......... *H04W 72/542* (2023.01); *H04W 72/04* (2013.01); *H04W 84/12* (2013.01)

(58) Field of Classification Search
CPC .... H04L 1/0029; H04L 1/0026; H04W 72/29; H04W 72/542; H04W 72/04; H04W 24/10; H04W 84/12
See application file for complete search history.

(56) References Cited

U.S. PATENT DOCUMENTS 8,243,835 B2     8/2012   Sun et al.
2013/0315323 A1* 11/2013  Porat .................... H04L 5/0026
                                                 375/260
(Continued)

FOREIGN PATENT DOCUMENTS

KR      20140054694 A     5/2014

OTHER PUBLICATIONS

"Follow-ups on Channel Measurement Procedure for WLAN Sensing", IEEE 802.11-20/xxxxr0, Jun. 2020, pp. 1-15.
(Continued)

*Primary Examiner* — Brian D Nguyen
(74) *Attorney, Agent, or Firm* — Murphy, Bilak & Homiller, PLLC

(57) ABSTRACT

A method is disclosed for a sensing coordination device associated with one or more wireless sensing devices comprising a first wireless sensing device. The method comprises determining a threshold value for the first wireless sensing device, wherein the threshold value is for comparison with a difference between channel estimates of wireless sensing measurements of the first wireless sensing device, and causing application of the threshold value in control of operation of the first wireless sensing device for performing wireless sensing measurements. A method for the first wireless sensing device is also disclosed. The method comprises acquiring the threshold value, and operating the first wireless sensing device based on the threshold value, wherein operating the first wireless sensing device based on the threshold value may comprise refraining from transmitting a report of the wireless sensing measurements when the difference between channel estimates of the wireless sensing measurements is less than the threshold value. Corresponding apparatuses, devices and computer program product are also disclosed.

26 Claims, 3 Drawing Sheets

(56)　　　　　References Cited

U.S. PATENT DOCUMENTS

| | | | |
|---|---|---|---|
| 2014/0112250 A1* | 4/2014 | Bahrenburg ...... | H04W 36/0094 |
| | | | 370/328 |
| 2019/0132156 A1* | 5/2019 | Wang ................. | H04L 25/0224 |
| 2019/0182674 A1* | 6/2019 | Li ....................... | H04W 12/122 |
| 2019/0313352 A1 | 10/2019 | Do et al. | |
| 2019/0363843 A1* | 11/2019 | Gordaychik .......... | H04W 28/16 |
| 2020/0275402 A1* | 8/2020 | Shi ........................ | H04W 16/28 |
| 2021/0266828 A1* | 8/2021 | Hwang ................. | H04W 72/23 |
| 2022/0236394 A1* | 7/2022 | Nam ........................ | G01S 13/46 |
| 2023/0309144 A1* | 9/2023 | Zhu ................... | H04W 56/0015 |
| 2024/0305390 A1* | 9/2024 | Aygül ................. | H04B 17/373 |

OTHER PUBLICATIONS

"Wi-Fi Sensing: Technical Feasibility, Standardization Gaps", IEEE 802.11-17/1850r0, Nov. 2019, pp. 1-27.
"Wireless LANs", IEEE 802.11-19/2103r4, CTPClassification= CTP_NT, 802.11 SENS SG Proposed PAR, Jan. 14, 2020, pp. 1-4.
"Collaborative WLAN Sensing", IEEE 802.11-20/1533r0, Sep. 2020, pp. 1-13.
V, Amrutha, et al., "Spectrum Sensing Methodologies in Cognitive Radio Networks: A Survey", Proceedings of IEEE International Conference on Innovations in Electrical, Electronics, Instrumentation and Media, Technology ICIEEIMT 17, 2017, pp. 306-310.

* cited by examiner

CONTROL OF WIRELESS SENSING DEVICES

TECHNICAL FIELD

The present disclosure relates generally to the field of wireless sensing. More particularly, it relates to controlling operation of one or more wireless sensing devices associated with a sensing coordination device.

BACKGROUND

Wireless sensing can be performed by detecting changes in a wireless propagation channel. To this end, a sensing receiver device (wireless sensing device) receives multiple physical layer packets transmitted by a sensing transmitter device (e.g., a radio access node), and performs measurements thereon. The measurements are used to detect and/or classify the occurrence of events.

Typical applications of wireless sensing include, but are not limited to, home security (e.g., intruder detection), control of home appliances (e.g., turning on/off lights in relation to resident location), health care (e.g., monitoring vital signs such as heart rate, breathing, etc.), production surveillance (e.g., monitoring machines in a factory).

Examples of sensing measurements include, but are not limited to, received signal strength indicator (RSSI) measurements, channel state information (CSI) measurements (e.g., measuring the frequency response of the propagation channel), and channel estimation measurements.

Wireless sensing may be seen as an enhancement for radio technologies that have been designed primarily for communication. For example, the IEEE 802.11 Working Group has initiated the task group 802.11bf with the purpose of developing a standard amendment to support wireless sensing.

Exemplification of scenarios, problems, solutions, and advantages will be given herein using terminology associated with IEEE 802.11. It should be noted that this is not intended as limiting, but merely as illustrative. In fact, the same—or corresponding—scenarios, problems, solutions, and/or advantages may be equally relevant for other radio technologies (e.g., as standardized by the third generation partnership project, 3GPP; examples including sixth generation, 6G, applications).

To be able to sense movements in an environment, the movements should cause variations in the propagation channel between the sensing transmitter and the sensing receiver (i.e., it is possible to sense movements in an environment when the movements cause variations in the propagation channel between the sensing transmitter and the sensing receiver). Hence, to provide sensing coverage for proper movement detection at all desired location(s) a large number of sensing receivers may be required.

In some scenarios, a sensing receiver sends reports to the sensing transmitter (or another sensing coordination device), wherein a report indicates a result of the sensing measurements performed by the sensing receiver. When there are a large number of sensing receivers, the amount of radio resources needed for transmission of such reports may become very large, which can be cumbersome. For example, overhead signaling due to sensing reports may be detrimental to the capacity available for data communication for devices involved in the sensing.

Therefore, there is a need for alternative approaches for wireless sensing. Preferably, such approaches improve the use of radio resources for sensing (e.g., decrease the overhead signaling due to sensing).

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a sensing coordination device associated with one or more (e.g., a plurality of) wireless sensing devices comprising a first wireless sensing device. The method comprises determining a threshold value for the first wireless sensing device, wherein the threshold value is for comparison with a difference between channel estimates of wireless sensing measurements of the first wireless sensing device, and causing application of the threshold value in control of operation of the first wireless sensing device for performing wireless sensing measurements.

In some embodiments, causing application of the threshold value comprises transmitting an indication of the threshold value to the first wireless sensing device.

In some embodiments, the difference between channel estimates of wireless sensing measurements quantifies one or more of: a variation between two consecutive channel estimates, and a number of differing channel estimates during a time interval.

In some embodiments, determining the threshold value for the first wireless sensing device comprises dynamically adjusting the threshold value over time.

In some embodiments, determining the threshold value for the first wireless sensing device comprises determining a dedicated threshold value for the first wireless sensing device.

In some embodiments, determining the threshold value for the first wireless sensing device comprises determining the threshold value based on a type of movement targeted by the wireless sensing measurements of the first wireless sensing device.

In some embodiments, determining the threshold value for the first wireless sensing device comprises determining the threshold value based on a number of wireless sensing devices in the one or more wireless sensing devices associated with the sensing coordination device.

In some embodiments, determining the threshold value for the first wireless sensing device comprises determining the threshold value based on a potential impact on a wireless sensing result that the wireless sensing measurements of the first wireless sensing device have.

In some embodiments, the one or more wireless sensing devices comprise two or more wireless sensing devices, and determining the threshold value for the first wireless sensing device is triggered by a second wireless sensing device comprised in the two or more wireless sensing devices associated with the sensing coordination device.

In some embodiments, application of the threshold value in control of operation of the first wireless sensing device comprises causing the first wireless sensing device to refrain from transmitting a report of the wireless sensing measurements when the difference between channel estimates of the wireless sensing measurements is less than the threshold value.

In some embodiments, wherein the one or more wireless sensing devices comprise two or more wireless sensing devices, and the method further comprises determining whether wireless sensing measurements for at least one second wireless sensing device comprised in the two or more wireless sensing devices associated with the sensing coordination device render the wireless sensing measurements for the first wireless sensing device redundant, and temporarily inactivating the first wireless sensing device responsive to determining that the wireless sensing measurements for the at least one second wireless sensing device render the wireless sensing measurements for the first wireless sensing device redundant.

In some embodiments, the method further comprises causing pre-allocation of radio resources for wireless sensing measurement reports, wherein a number of pre-allocated radio resources is less than a number of radio resources needed for wireless sensing measurement reports from all wireless sensing devices of the one or more wireless sensing devices associated with the sensing coordination device.

A second aspect is a method for a first wireless sensing device associated with a sensing coordination device. The method comprises acquiring a threshold value determined by the sensing coordination device for the first wireless sensing device, wherein the threshold value is for comparison with a difference between channel estimates of wireless sensing measurements of the first wireless sensing device, and operating the first wireless sensing device based on the threshold value.

In some embodiments, the first wireless sensing device is comprised in one or more (e.g., a plurality of) wireless sensing devices associated with the sensing coordination device.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a sensing coordination device configured for association with one or more (e.g., a plurality of) wireless sensing devices comprising a first wireless sensing device. The apparatus comprises controlling circuitry configured to cause determination of a threshold value for the first wireless sensing device, wherein the threshold value is for comparison with a difference between channel estimates of wireless sensing measurements of the first wireless sensing device, and application of the threshold value in control of operation of the first wireless sensing device for performing wireless sensing measurements.

A fifth aspect is a sensing coordination device comprising the apparatus of the fourth aspect.

A sixth aspect is an apparatus for a wireless sensing device configured for association with a sensing coordination device. The apparatus comprises controlling circuitry configured to cause acquisition of a threshold value determined by the sensing coordination device for the wireless sensing device, wherein the threshold value is for comparison with a difference between channel estimates of wireless sensing measurements of the wireless sensing device, and operation of the wireless sensing device based on the threshold value.

A seventh aspect is a wireless sensing device comprising the apparatus of the sixth aspect.

In some embodiments, any of the above aspects may additionally have features identical with or corresponding to any of the various features as explained above for any of the other aspects.

An advantage of some embodiments is that alternative (e.g., improved) approaches for wireless sensing are provided.

An advantage of some embodiments is that the use of radio resources for sensing is improved. For example, the overhead signaling due to sensing may be reduced. An advantage of some embodiments is that the use of radio resources for sensing reports is reduced.

An advantage of some embodiments is that the capacity available for other applications than sensing (e.g., data communication) is increased.

An advantage of some embodiments is that sensing performance is maintained (or at least not substantially degraded).

An advantage of some embodiments is that sensing can be dynamically tailored for different purposes and/or scenarios.

An advantage of some embodiments is that the power consumption of wireless sensing devices is decreased.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
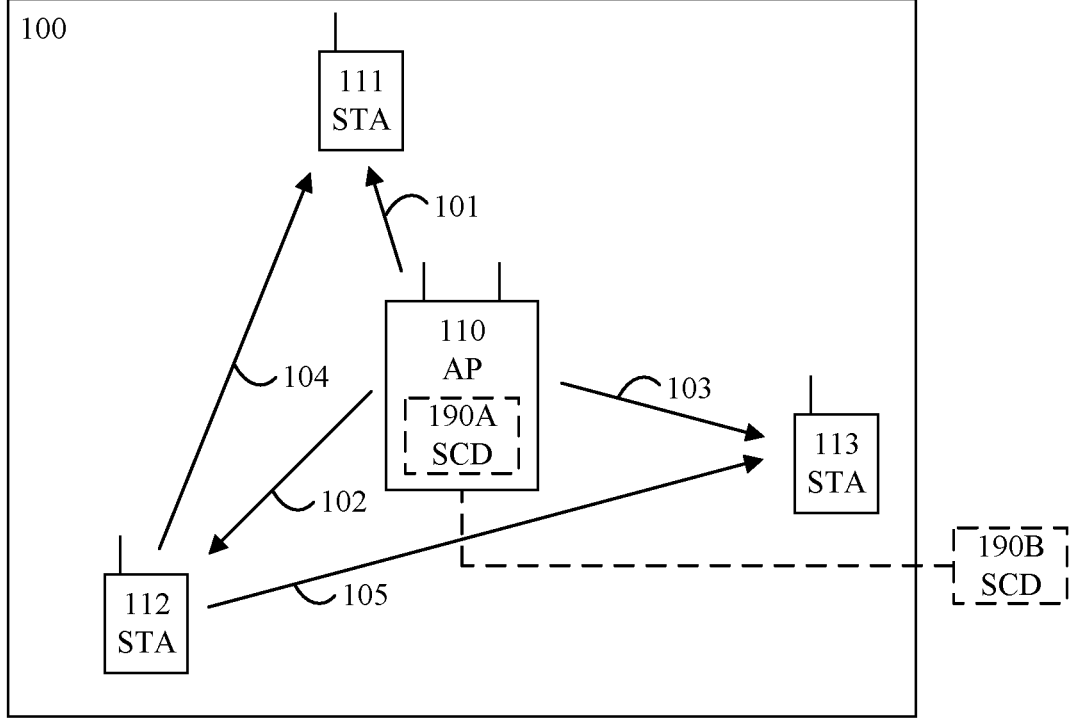
FIG. 1 is a schematic drawing illustrating an example scenario wherein some embodiments may be applicable.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches for wireless sensing are provided. The values of one or more thresholds are used by a sensing coordination device to control operation of one or more wireless sensing devices associated with the sensing coordination device. Each threshold and/or threshold value may be specific for one wireless sensing device, or may be used for more than one (e.g., all) of the wireless sensing devices associated with the sensing coordination device. Alternatively or additionally, different thresholds may have different purposes. The threshold value(s) may be dynamically adjustable. Threshold values and/or conditions for determining threshold values may be specified in a standard (e.g., an IEEE 802.11 standard, a 3GPP standard, or the like) according to some embodiments.

In some embodiments, a threshold is applied to control whether or not a wireless sensing device should send a sensing report. For example, the wireless sensing device may refrain from sending a sensing report when the difference between channel estimates of wireless sensing measurements is lower than the threshold value. The difference may be expressed in terms of a variation between two consecutive channel estimates (e.g., a difference in magnitude for RSSI measurements). Alternatively or additionally, the difference may be expressed in terms of how many differing channel estimates there are during a time interval. In the latter case, the wireless sensing device may send a report when the number of consecutive sensing measurements that have different channel estimates exceeds the threshold value (which may be equal to, e.g., two, three, or more), and may refrain from sending a sensing report when the number of consecutive sensing measurements that have different channel estimates does not exceed the threshold value.

In some examples, the threshold value is set to a maximum value to practically inactivate sensing reporting for a wireless sensing device. This may be beneficial when sensing measurements for that wireless sensing device are not contributing (or are contributing only marginally) to a sensing result; i.e., sensing measurements may be considered redundant. One scenario where some sensing measurements may be redundant is when two wireless sensing devices are able to sense the same radio channel (e.g., due to them being located in a vicinity of each other). Alternatively or additionally, one scenario where some sensing measurements may be redundant is when the sensing result is currently not targeting movements in the radio channel of a wireless sensing device.

In some embodiments, the sensing measurements may be inactivated in addition to inactivating sensing reporting. For example, the sensing coordination device may instruct a wireless sensing device to inactivate sensing measurements (e.g., by setting the threshold to the maximum value, or by providing a separate instruction).

In some embodiments, the threshold value is set based on a type of movement targeted by the wireless sensing measurements of a wireless sensing device. For example, when it is desirable to detect relatively small movements (e.g., seismic activity, or life signs such as breathing, heartbeat, etc.) affecting the radio channel sensed by the wireless sensing device, the threshold may be set to a relatively low value, and when it is desirable to only detect relatively large movements (e.g., movements of a person, unauthorized presence, etc.) affecting the radio channel sensed by the wireless sensing device, the threshold may be set to a relatively high value.

In some embodiments, the threshold value is set based on a number of wireless sensing devices associated with the sensing coordination device (e.g., the total number of wireless sensing devices associated with the sensing coordination device, or the number of currently active wireless sensing devices associated with the sensing coordination device). For example, when the number of wireless sensing devices is relatively small, the threshold may be set to a relatively low value, and when the number of wireless sensing devices is relatively large, the threshold may be set to a relatively high value.

Any suitable combination of the above approaches may be equally applicable according to various embodiments. For example, the threshold value applied to control whether or not a wireless sensing device should send a sensing report may be set based on a type of movement targeted and the number of wireless sensing devices.

In some embodiments, the number of radio resources used for sensing reports is restricted by pre-allocation of radio resources that may be used for sensing reports, wherein the number of pre-allocated radio resources is less than needed for wireless sensing measurement reports from all wireless sensing devices. For example, the number of pre-allocated radio resources may be equal to, or less than, what is needed for wireless sensing measurement reports from all active wireless sensing devices. Alternatively or additionally, the number of pre-allocated radio resources may be equal to, or less than, what is needed for wireless sensing measurement reports from all wireless sensing devices with a threshold value lower than a specific value (e.g., lower than the maximum value).

Yet alternatively or additionally, the number of pre-allocated radio resources may be based on (e.g., equal to) an expected number of reports, wherein the expected number of reports is determined based on the threshold values currently applied to the wireless sensing devices. For example, wireless sensing devices having a relatively low threshold value may be expected to send sensing reports relatively often, while wireless sensing devices having a relatively high threshold value may be expected to send sensing reports relatively seldom.

In some embodiments, a random access procedure is applied for a wireless sensing device to send a sensing report in a pre-allocated radio resource.

Generally, when an access point (AP) is referred to herein, it should be understood that any features and/or effects described as relating to the AP are equally applicable in relation to any other radio access node (e.g., a base station, BS; for example configured to operate in compliance with a suitable 3GPP standard, such as a 6G standard).

Also generally, when a station (STA) is referred to herein, is should be understood that any features and/or effects described as relating to the STA are equally applicable in relation to any other wireless device (e.g., a user equipment, UE; for example configured to operate in compliance with a suitable 3GPP standard, such as a 6G standard).

FIG. 1 schematically illustrates an example scenario where sensing approaches according to some embodiments may be applicable.

The scenario of FIG. 1 relates to an environment 100 (e.g., a room), which is to be partly or fully covered by wireless sensing. Within the environment 100, there is located an access point (AP) 110 and one or more stations (STA) 111, 112, 113.

A station 111, 112, 113 may be a sensing receiver device (a wireless sensing device). Thus, when the AP acts as a sensing transmitter device, the station 111, 112, 113 may be configured to perform sensing measurements in relation to a radio channel between the AP and the station 111, 112, 113 as illustrated by 101, 102, 103. Alternatively or additionally, when one station 112 acts as sensing transmitter device, the other stations 111, 113 may be configured to perform sensing measurements in relation to a radio channel between the sensing transmitter device station and the sensing receiver device station as illustrated by 104, 105.

In some embodiments, a station 111, 112, 113 may additionally be a wireless communication device; e.g., configured for wireless communication with the access point 110 in uplink and/or downlink.

A sensing coordination device (SCD) 190A, 190B may be configured to perform sensing coordination. In some embodiments, sensing coordination comprises one or more of: controlling sensing transmission and/or reception, controlling sensing reporting, collecting sensing measurement results, and analyzing sensing measurement results.

The sensing coordination device may be comprised in the AP 110 as illustrated by SCD 190A, or may be otherwise associated with (e.g., connected to) the AP 110 as illustrated by SCD 190B. In the latter case, the SCD 190B may be comprised in one of the STAs 111, 112, 113, or in a control node (e.g., a central network node, or a server node) within or external to the environment 100. In some embodiments, the SCD 190B is implemented within a cloud architecture.

Generally, it should be noted that there are different scenarios for the SCD (the device that supports sensing). In one example, a sensing receiver device (i.e., a device configured to perform measurements used for wireless sensing) comprises the device that supports sensing. In one example, a sensing transmitter device (i.e., a device configured to transmit signals suitable for sensing measurements) comprises the device that supports sensing. In one example, the device that supports sensing is not comprised in any of the sensing receiver or transmitter devices.

In some embodiments, several sensing receiver devices may perform sensing measurements on the same transmitted packet. Thus, there may be joint sensing measurements performed by two or more sensing receiver devices using the same packet. This may reduce the overhead due to sensing compared to when a packet is used for sensing measurements by only one sensing receiver device. Application of some embodiments, reduces the overhead due to sensing even further, since the number of sensing reports are reduced.

In the following, exemplification will be made where a sensing coordination device is associated with a plurality of wireless sensing devices (i.e., two or more wireless sensing devices) comprising a first wireless sensing device. It should be noted however, that the exemplification by a plurality is not intended as limiting. Thus, in some embodiments, a sensing coordination device may be associated with a single wireless sensing device (i.e., the first wireless sensing device).

Figure 2:
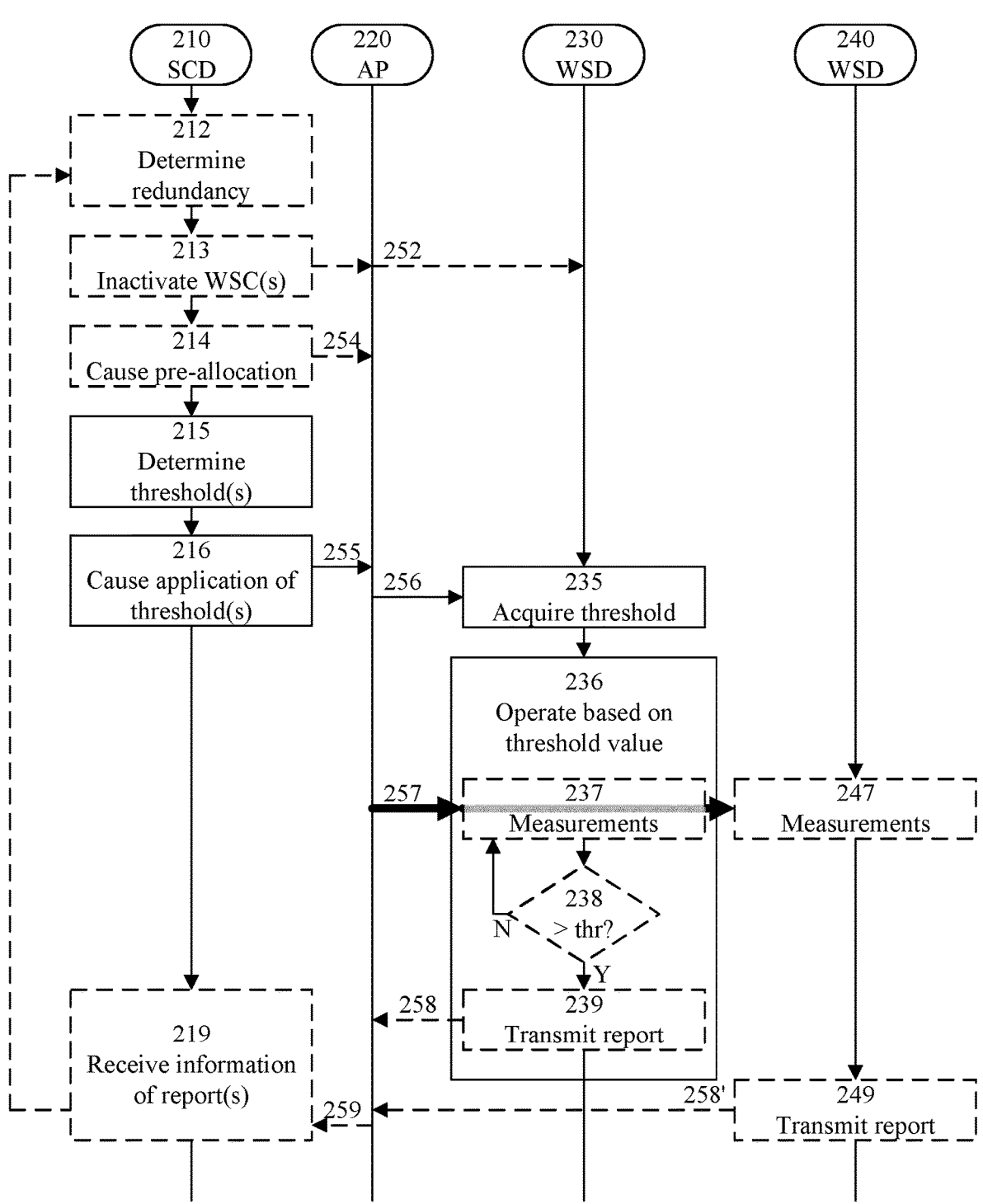
FIG. 2 is a combined flowchart and signaling diagram illustrating example method steps and signaling according to some embodiments.

FIG. 2 illustrates principles according to some embodiments, by example method steps and signaling relating to a sensing coordination device (SCD) 210, an access point (AP) 220, a first wireless sensing device (WSD) 230, and a second wireless sensing device (WSD) 240. In this example, the AP 220 act as sensing transmitter device and the first and second WSDs 230, 240 act as sensing receiver devices.

The SCD 210 is associated with (e.g., comprised in, or connected to) the AP 220 and with a plurality of WSDs (including the WSDs 230, 240). For example, the SCD may correspond to any of the SCDs 190A, 190B of FIG. 1, the AP 220 may correspond to the AP 110 of FIG. 1, each of the WSDs 230, 240 may correspond to one of the STAs 111, 112, 113 of FIG. 1. When the SCD 210 is comprised in the AP 220, the signaling between the SCD 210 and the AP 220 may be omitted, or may be considered as internal signaling within the AP 220.

In step 215, the SCD 210 determines a threshold value for the first WSD 230. Step 215 may also comprise determining threshold value(s) for one or more second WSD 240 (e.g., some, or all, of the plurality of WSDs associated with the SCD 210). Generally, a threshold value determined for one WSD may be a dedicated threshold value for that WSD only (e.g., associated with a location of the WSD), or may be applicable also for one or more other WSDs (e.g., some, or all, of the plurality of WSDs associated with the SCD 210).

The threshold value is for comparison with a difference between channel estimates of wireless sensing measurements of the first wireless sensing device. A difference between channel estimates of wireless sensing measurements of the first wireless sensing device indicates a change in the sensed radio channel (e.g., due to a change in the environment). The difference between channel estimates of wireless sensing measurements may quantify a variation between two consecutive channel estimates and/or a number of differing channel estimates during a time interval (e.g., differing consecutive channel estimates).

Example metrics for variation between two consecutive channel estimates include a magnitude difference for RSSI measurements, a CSI index difference, and a mean difference between channel responses (in time and/or frequency).

A threshold value may be determined based on a type of movement targeted by the wireless sensing measurements of the WSD(s) where the threshold value is applied. For example, relatively small movements are targeted, the threshold may be set to a relatively low value, and when only relatively large movements are targeted, the threshold may be set to a relatively high value.

Alternatively or additionally, a threshold value may be determined based on a number of WSDs that are associated with the SCD 210 (e.g., the total number of WSDs associated with the SCD, or the number of currently active WSDs associated with the SCD). For example, when the number of wireless sensing devices is relatively small, the threshold may be set to a relatively low value, and when the number of wireless sensing devices is relatively large, the threshold may be set to a relatively high value.

In step 216, the SCD 210 causes application of the threshold value in control of operation of the first WSD 230 for performing wireless sensing measurements. Step 216 typically comprises causing the AP 220 to transmit an indication 256 of the threshold value to the first WSD 230. For example, step 216 may comprise transmitting an indication 255 of the threshold value to the AP 220 to trigger the AP 220 to transmit the indication 256 of the threshold value to the first WSD 230. When threshold value(s) have been determined also for one or more second WSD 240, step 216 may further comprise causing—in a corresponding manner—application of the threshold value(s) in control of operation of the second WSDs 240 for performing wireless sensing measurements.

The threshold value is acquired by the first WSD 230 in step 235; e.g., by reception of the indication 256 of the threshold value. As illustrated by step 236, the first WSD 230 then operates based on the threshold value.

Step 236 may comprise performing wireless sensing measurements on transmission(s) 257 from the AP 220, as illustrated by optional sub-step 237. Corresponding wireless sensing measurements may also be performed by one or more second WSD(s) 240, as illustrated by optional step 247.

Step 236 may also comprise comparing the threshold value (thr) with a difference between channel estimates of wireless sensing measurements performed by the first WSD 230, as illustrated by optional sub-step 238. For example, the threshold value may be compared to a variation between two consecutive channel estimates and/or the threshold value may be compared to the number of differing channel estimates during a time interval.

When the difference between channel estimates of wireless sensing measurements performed by the first WSD 230 exceeds the threshold (Y-path out of 238), the WSD 230 transmits a report 258 of the wireless sensing measurements, as illustrated by optional sub-step 239. Corresponding reports 258' of wireless sensing measurements performed may also be transmitted by one or more second WSD(s) 240, as illustrated by optional step 249. The report(s) 258, 258' are received by the AP 220 and corresponding information 259 may be forwarded to the SCD 210, which receives it in optional step 219.

When the difference between channel estimates of wireless sensing measurements performed by the first WSD 230 does not exceed (e.g., is less than) the threshold, the WSD 230 refrains from transmitting any report of the wireless sensing measurements, as illustrated by the N-path out of 238. Thereby, reports relating to wireless sensing measurements that detect no (or a relatively low amount of) change in the sensed radio channel are not transmitted, which typically reduces the overhead signaling due to sensing reporting without adversely affecting the sensing result. Alternatively or additionally, transmitting less sensing reports may have the effect of reducing power consumption in the WSD 230.

As illustrated by optional step 212, the SCD 210 may also determine whether or not wireless sensing measurements for the first WSD 230 are redundant (e.g., whether the sensing measurements for the first WSD 230 do not, or do, contribute anything to a sensing result). Put differently, step 212 may comprise determining a potential impact on a wireless sensing result that the wireless sensing measurements of the first WSD 230 have. When the potential impact is relatively low (i.e., when the sensing measurements for the first WSD 230 contribute relatively little to a sensing result, and/or when excluding the sensing measurements for the first WSD 230 does not compromise the sensing accuracy), the wireless sensing measurements for the first WSD 230 may be considered as redundant.

In one example for step 212, the SCD 210 determines whether or not wireless sensing measurements for the second WSD 240 render wireless sensing measurements for the first WSD 230 redundant (e.g., whether—conditioned on the sensing measurements for the second WSD 240—the sensing measurements for the first WSD 230 do not, or do, contribute anything further to a sensing result).

One scenario where some sensing measurements may be redundant is when the WSDs 230, 240 are able to sense the same radio channel (e.g., due to them being located in a vicinity of each other). This scenario may be dynamically occurring when one or both of the WSDs 230, 240 are mobile, for example.

One scenario where some sensing measurements may be redundant is when the sensing result is not targeting movements for the radio channel sensed by the WSD 230 until movements are detected for the radio channel sensed by the WSD 240. This scenario may be dynamically occurring when an environment is known to be empty and can only be accessed by causing movement for the radio channel sensed by the WSD 240.

When the wireless sensing measurements for the first WSD 230 are determined to be redundant, the SCD 210 may inactivate the first WSD 230, as illustrated by optional step 213. This may have the effect of reducing power consumption in the WSD 230. Inactivation, may be implemented by the AP 220 sending an inactivation instruction 252 to the WSD 230, for example.

The inactivation may be temporary, and the SCD 210 may be configured to re-activate the WSD 230 when the sensing measurements for the first WSD 230 are no longer redundant The inactivation may comprise causing the WSD 230 to refrain from performing any wireless sensing measurements at all. Thus, steps 215, 216, 235, 236 may be omitted for the WSD 230 while the WSD 230 is inactivated.

In some embodiments, step 215 comprises determining a threshold value for the first WSD 230 based on a potential impact on a wireless sensing result that the wireless sensing measurements of the first WSD 230 have.

For example, the threshold may be set to a relatively high (e.g., a maximum) value when wireless sensing measurements of the first WSD 230 have a relatively low potential impact on the sensing result (e.g., when the sensing measurements for the first WSD 230 are redundant, when the sensing measurements for the first WSD 230 do not contribute to a sensing result, when excluding the sensing measurements for the first WSD 230 does not compromise the sensing accuracy, etc.). This may have the effect of (at least in practice) inactivating the sensing report transmission 239.

In some embodiments, setting the threshold value based on potential impact on a wireless sensing result may be seen as an alternative—or a complement—to inactivating a WSD based on potential impact on a wireless sensing result (although the former may not inactivate sensing measurements 237 as the latter does).

The threshold value(s) may be dynamically adjusted over time, as illustrated by the loop-back from 219 to 212.

In one example of dynamic adjustment of the threshold value(s), determining the threshold value for the first WSD 230 in step 215 is triggered by the second WSD 240 (e.g., by content of the report 258'). For example, the current threshold value for the first WSD 230 may be relatively high (e.g., a maximum value due to sensing measurements being considered redundant), when movements are detected for the radio channel sensed by the WSD 240 that trigger the threshold value for the first WSD 230 to be lowered. This scenario may be occurring when an environment is known to be empty and can only be accessed by causing movement for the radio channel sensed by the WSD 240, and where it is desired to detect movements in the full environment after movements have been detected for the radio channel sensed by the WSD 240 (indicating someone entering the environment).

In optional step 214, the SCD 210 causes pre-allocation of radio resources for wireless sensing measurement reports (e.g., by instructing the AP 220 to perform the allocation, as illustrated by 254). The pre-allocated radio resources may be any suitable radio resources (e.g., enabling multiplexing of sensing reports from several WSDs).

The number of pre-allocated radio resources may be less than the number of radio resources needed for wireless sensing measurement reports from all WSDs. This has the effect of reducing the overhead signaling due to sensing reporting.

For example, the number of pre-allocated radio resources may be less than needed for wireless sensing measurement reports from all wireless sensing devices, and/or equal to (or less than) needed for wireless sensing measurement reports from all active wireless sensing devices, and/or equal to (or less than) needed for wireless sensing measurement reports from all wireless sensing devices with a threshold value lower than a specific value (e.g., lower than the maximum value). Alternatively or additionally, the number of pre-allocated radio resources may be based on (e.g., equal to) an expected number of reports. The expected number of reports may be determined based on the threshold values currently applied to the wireless sensing devices.

In some embodiments, a random access procedure is applied for a wireless sensing device to send a sensing report in a pre-allocated radio resource. In some embodiments, sensing reports that have not been transmitted are discarded after some specified time.

When the radio resources are also used for communication of data, the sensing reports and the data may be assigned different priorities for the random access procedure. For example, time critical information (sensing reports or data) may be assigned higher random access priority that non-time critical information. The priorities may be implemented using step 215; setting the threshold value(s) based on the priority of sensing reports. When it is important that movements sensed by a WSD are noted quickly by the SCD 210, the corresponding sensing reports may be assigned a relatively high priority by setting the threshold to a relatively low level. When time-critical data services share the radio resources used for sensing reports, the sensing reports may be assigned a relatively low priority by setting the threshold to a relatively high level.

Figure 3:
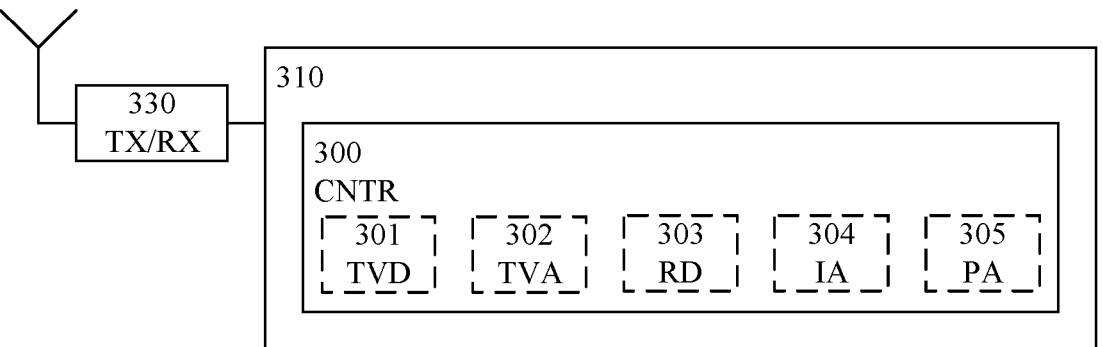
FIG. 3 is a schematic block diagram illustrating an example apparatus according to some embodiments.

FIG. 3 schematically illustrates an example apparatus according to some embodiments. The apparatus is for (e.g., comprised, or comprisable, in) a sensing coordination device 310. The sensing coordination device 310 is configured for association with a plurality of wireless sensing devices.

The sensing coordination device 310 may, for example, correspond to any of: the SCD 190A comprised in the AP 110 of FIG. 1, the SCD 190B associated with the AP 110 of FIG. 1, and the SCD 210 associated with, or comprised in, the AP 220 of FIG. 2. In some embodiments an AP or a control node comprising the sensing coordination device 310 may, in itself, be denoted as a sensing coordination device.

The apparatus of FIG. 3 comprises a controller (CNTR; e.g., controlling circuitry—such as a processor- or a control module) 300.

The controller 300 is configured to cause determination of a threshold value for a first wireless sensing device comprised in the plurality of wireless sensing devices, wherein the threshold value is for comparison with a difference between channel estimates of wireless sensing measurements of the first wireless sensing device (compare with 215 of FIG. 2). To this end, the controller 300 may comprise, or be otherwise associated with (e.g., connected, or connectable, to) a threshold value determiner (TVD; e.g., threshold value determining circuitry or a threshold value determination module) 301. The threshold value determiner 301 may be configured to determine the threshold value for the first wireless sensing device.

The controller 300 is also configured to cause application of the threshold value in control of operation of the first wireless sensing device for performing wireless sensing measurements (compare with 216 of FIG. 2). To this end, the controller 300 may comprise, or be otherwise associated with (e.g., connected, or connectable, to) a threshold value applier (TVA; e.g., threshold value applying circuitry or a threshold value application module) 302. The threshold value applier 302 may be configured to apply the threshold value in control of operation of the first wireless sensing device.

For example, the controlling circuitry and/or the threshold value applier may be configured to cause application of the threshold value by causing transmission of an indication of the threshold value to the first wireless sensing device. To this end, the controller 300 may comprise, or be otherwise associated with (e.g., connected, or connectable, to) a transmitter (e.g., transmitting circuitry or a transmission module); illustrated in FIG. 3 as comprised in a transceiver 330. The transmitter may be configured to transmit the indication of the threshold value to the first wireless sensing device.

In some embodiments, the controlling circuitry is further configured to cause reception of one or more reports of wireless sensing measurements carried out by the wireless sensing devices (compare with 219 of FIG. 2). To this end, the controller 300 may comprise, or be otherwise associated with (e.g., connected, or connectable, to) a receiver (e.g., receiving circuitry or a reception module); illustrated in FIG. 3 as comprised in the transceiver 330. The receiver may be configured to receive the report(s) of wireless sensing measurements.

In some embodiments, the controlling circuitry is further configured to cause determination of whether wireless sensing measurements for the first wireless sensing device are redundant; e.g., due to wireless sensing measurements for at least one second wireless sensing device comprised in the plurality of wireless sensing devices associated with the sensing coordination device render the wireless sensing measurements for the first wireless sensing device redundant (compare with 212 of FIG. 2). To this end, the controller 300 may comprise, or be otherwise associated with (e.g., connected, or connectable, to) a redundancy determiner (RD; e.g., redundancy determining circuitry or a redundancy determination module) 303. The redundancy determiner 303 may be configured to determine whether wireless sensing measurements for the first wireless sensing device are redundant.

The controller 300 may be further configured to cause temporary inactivation of the first wireless sensing device responsive to determination that the wireless sensing measurements for the first wireless sensing device are redundant (compare with 213 of FIG. 2). To this end, the controller 300 may comprise, or be otherwise associated with (e.g., connected, or connectable, to) an inactivator (IA; e.g., inactivating circuitry or an inactivation module) 304. The inactivator 304 may be configured to temporarily inactivate the first wireless sensing device.

In some embodiments, the controlling circuitry is further configured to cause pre-allocation of radio resources for wireless sensing measurement reports (compare with 214 of FIG. 2). To this end, the controller 300 may comprise, or be otherwise associated with (e.g., connected, or connectable, to) a pre-allocator (PA; e.g., pre-allocating circuitry or a pre-allocation module) 305; for example a scheduler. The pre-allocator 305 may be configured to pre-allocate the radio resources for wireless sensing measurement reports.

Figure 4:
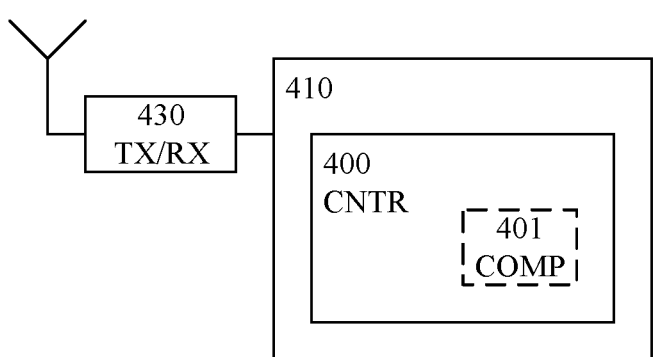
FIG. 4 is a schematic block diagram illustrating an example apparatus according to some embodiments.

FIG. 4 schematically illustrates an example apparatus according to some embodiments. The apparatus is for (e.g., comprised, or comprisable, in) a wireless sensing device 410. The wireless sensing device 410 is configured for association with a sensing coordination device.

The wireless sensing device 410 may, for example, correspond to any of: a STA 111, 112, 113 of FIG. 1, and the WSD 230 of FIG. 2.

The apparatus of FIG. 4 comprises a controller (CNTR; e.g., controlling circuitry—such as a processor—or a control module) 400.

The controller 400 is configured to cause acquisition of a threshold value determined by the sensing coordination device for the wireless sensing device, wherein the threshold value is for comparison with a difference between channel estimates of wireless sensing measurements of the wireless sensing device (compare with 235 of FIG. 2).

For example, the controlling circuitry may be configured to cause acquisition of the threshold value by causing reception of an indication of the threshold value. To this end, the controller 400 may comprise, or be otherwise associated with (e.g., connected, or connectable, to) a receiver (e.g., receiving circuitry or a reception module); illustrated in FIG. 4 as comprised in a transceiver 430. The receiver may be configured to receive the indication of the threshold value.

The controller 400 is also configured to cause operation of the wireless sensing device based on the threshold value (compare with 236 of FIG. 2).

For example, the controlling circuitry may be configured to cause the wireless sensing device to refrain from transmission of a report of the wireless sensing measurements responsive to the difference between channel estimates of the wireless sensing measurements being less than the threshold value (compare with 238 of FIG. 2). To this end, the controller 400 may comprise, or be otherwise associated with (e.g., connected, or connectable, to) a comparator (COMP; e.g., comparing circuitry or a comparison module) 401. The comparator 401 may be configured to determine whether the difference between channel estimates of the wireless sensing measurements are less than the threshold value and—if so—hinder transmission of the report.

It should be noted that any suitable features mentioned earlier (e.g., features described in connection with FIG. 2) may be equally applicable also for FIG. 3 and/or FIG. 4, even if not explicitly mentioned in connection thereto.

Some embodiments aim to reduce signaling overhead caused by sensing. Signaling overhead may be caused by sensing in the form of transmission of sensing packets and/or transmission of sensing reports, and some embodiments aim to reduce mainly the signaling overhead caused by sensing reports. Alternatively or additionally, some embodiments aim to reduce power consumption for wireless sensing receivers.

For example, in some applications (e.g., surveillance, tracking of objects, and the like) the movement detected by different sensing receivers can be highly correlated. Then, some embodiments suggest to dynamically activate/inactivate sensing receivers based on detections of other sensing receivers (e.g., in the vicinity) have detected. Alternatively or additionally, some embodiments suggest to dynamically change the sensitivity of the sensing receivers by changing how much channel variations should be experienced before reporting that there is any movement. The latter is implemented by determination and application of a threshold value as exemplified above.

Some further exemplification will now be provided in relation to a set-up that largely resembles the IEEE 802.11 standard. For example, the physical layer and the use of OFDMA (Orthogonal Frequency Division Multiple Access) are illustrated for a 20 MHz channel supporting multiplexing of up to 9 users.

As already mentioned, a purpose of wireless sensing is to detect variations in the radio environment by comparing the channel characteristics at different instants of time. The more the channel changes, the easier it typically is to detect the change. Thus, for a sensing receiver to be able to detect movement in the environment, the radio channel between the sensing transmitter and the sensing receiver must be sufficiently impacted by the movement.

Therefore, it can be expected that a sensing receiver may easily detect movements that occur between the sensing transmitter and the sensing receiver, while movements that occur far away from the line of sight between the sensing transmitter and the sensing receiver may cause too small variations in the radio channel for the sensing receiver to be able to detect the movements.

Hence, to allow that movements are detected in an environment (e.g., a room; compare with FIG. 1), irrespectively of where in the environment the movements occur, it may be required to use several sensing receivers. If the environment is large, the total number of sensing receivers may be huge. Sensing reporting may therefore use a non-negligible part of the available radio resources. If a sensing receiver device (e.g., a STA) has communication data that is to be transmitted to the sensing transmitter (e.g., an AP), the sensing report may be piggy-backed on the data. In the general case, sensing reporting may typically require that a packet dedicated to a sensing report is transmitted from each of the sensing receivers for each measurement event. Some embodiments presented herein aim to mitigate the drawbacks of sensing reporting.

In one example scenario, a sensing receiver device may temporarily be in the vicinity of another sensing receiver device. Then, it may only be necessary that one of these sensing receiver devices perform sensing measurements and send corresponding sensing reports, and the other sensing device may be hindered from transmitting sensing reports (e.g., by setting a high threshold value) and/or may be inactivated (e.g., by entering a low power, or sleep, mode).

If only one of the sensing receiver devices also communicate data to/from the sensing transmitter, it may be beneficial to select that sensing receiver device for performing sensing measurements and sending corresponding sensing reports (e.g., due to the possibility to perform sensing measurements on data-carrying packets and/or due to the possibility of piggy-backing sensing reports).

In one example scenario, it is known that a sensing receiver device will not detect any movement before movement detection by another sensing receiver device (e.g., empty room where the latter sensing receiver device covers the only entry point). Then, it may only be necessary that the latter sensing receiver device performs sensing measurements and send corresponding sensing reports, and the former sensing receiver device may be hindered from transmitting sensing reports (e.g., by setting a high threshold value) and/or may be inactivated (e.g., by entering a low power, or sleep, mode), until movement is detected by the latter sensing receiver device.

In a low power mode, a sensing receiver may not have to listen to sensing transmissions (e.g., beacons) to detect movements in the environment. For example, the sensing receiver may instead be requested to listen to only some beacons (e.g., every 100 beacon). Such requirements may be beneficial for the sensing receiver device to stay synchronized to the AP and/or for the AP to have a way to be able to wake up the sensing receiver device from the low power mode when applicable.

In some scenarios, it can be expected that no channel changing activity is detected for a large majority of the sensing measurements events. Thus, corresponding sensing reports would merely convey the information that no channel changes have been sensed. To avoid sending (a possibly huge number of) such sensing reports, an approach according to some embodiments comprises causing the sensing receiver device to send a sensing report only when any detected channel changes are considered significant. To define what is to be considered as significant, a threshold value is used. As already explained, the threshold value may, for example, specify that the radio channel has changed from one time instant to the next by some amount, and/or that channel changes have been detected for two or more consecutive measurements.

Alternatively or additionally, the threshold value may be used to regulate sensing reporting for other scenarios.

The threshold value may be used as a means to practically inactivate sensing reporting from a sensing receiver device; by setting the threshold value to a high (e.g., maximum) value.

The threshold value may be based on the type of movements targeted for detection.

The threshold value may be based on how many (active) sensing receiver devices are involved in the sensing.

Thus, application of the threshold value may be used to regulate sensing reporting (e.g., to only send sensing reports when something has actually been sensed). This approach may result in power savings at the sensing receiver device and/or in reduced radio resource use.

However, radio resources for sensing report packets may still need to be allocated (e.g., when it is not desirable to let the sensing receiver device contend for the channel, leading to unpredictability concerning when a sensing report can be sent). According to some embodiments, the amount of radio resources used for sensing reporting may be controlled (e.g., decreased) by pre-allocating an amount of radio resources for this purpose that is lower than the amount of radio resources needed if all sensing receiver devices would send sensing reports. For example, the pre-allocation may enable multiplexing of sensing reports from several sensing receiver devices using random access.

The amount of pre-allocated radio resources may be dynamically variable (e.g., using a high amount when relatively much movement is present/expected and a small amount when relatively little movement id present/expected).

Pre-allocation of an amount of radio resources that is lower than the amount of radio resources needed if all sensing receiver devices would send sensing reports may be enabled by use of the threshold value elaborated on above. This is since the threshold value typically results in that less than all sensing receiver devices send sensing reports.

Furthermore, the threshold value and the amount of pre-allocated resources may be dependent on each other. For example, relatively lower threshold value(s) (and/or a relatively higher amount of active sensing receiver devices) may correspond to relatively more pre-allocated radio resources for sensing reporting.

Thus, enabling that a reduced number of sensing reports is being sent entails a possibility to use a smaller number of radio resources for conveying the sensing reports; e.g., by means of statistical multiplexing.

In one example, the number of radio resources pre-allocated for sensing reporting is strictly less than the number of sensing receiver devices that may potentially send a sensing report. This approach is based on the fact that it is very unlikely that all (or even a large fraction of) the sensing receiver devices will detect a channel change that exceeds its threshold value.

One way to use pre-allocation involves using the random access for OFDMA that is standardized in 802.11ax (i.e., UORA, uplink OFDMA-based random access). In some approaches, the sensing receiver devices may compete for the pre-allocated radio resources in the same way as any STA does for uplink random access.

One way to use pre-allocation involves using the principles of enhanced distributed channel access (EDCA). In some approaches, the sensing receiver devices may be allocated to another access category than STAs competing for channel access to send communication data (e.g., giving the STAs sending communication data a higher or lower priority than the sensing receiver devices).

In any random access scenario, sensing reports may be discarded when they have been in the transmission buffer of a sensing receiver device for more than some specified time duration (e.g., determined by the sensing coordination device).

In one example, pre-allocation may be achieved by having the radio resources pre-allocated at regular intervals (e.g., corresponding to an uplink resource allocation directly after a downlink packet used for sensing).

In one example, pre-allocation may be performed one on a packet-by-packet basis (e.g., in terms of random access, or a dedicated poll packet prompting the sensing receiver devices to respond if they have detected movement).

In one example, the dedicated poll packet is sent less often than the downlink packets intended for sensing. This may be suitable when the sensing application is not time-critical.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a radio access node.

Embodiments may appear within an electronic apparatus (such as a wireless communication device or a radio access node) comprising arrangements, circuitry, and/or logic according to any of the embodiments described herein. Alternatively or additionally, an electronic apparatus (such as a wireless communication device or a radio access node) may be configured to perform methods according to any of the embodiments described herein.

Figure 5:
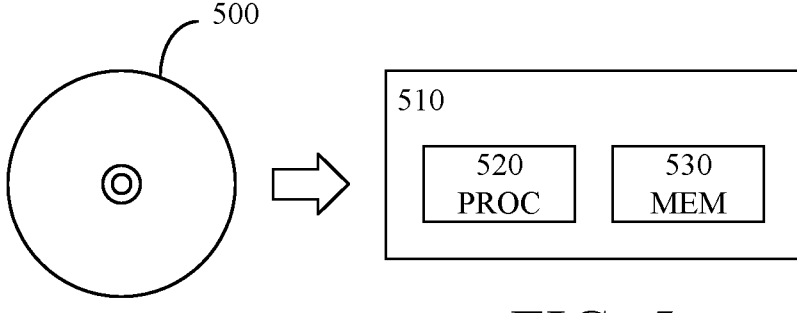
FIG. 5 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a wireless communication device or a radio access node 510. When loaded into the data processor, the computer program may be stored in a memory (MEM) 530 associated with or comprised in the data processor. According to some embodiments, the computer program may, when loaded into and run by the data processor, cause execution of method steps according to, for example, any of the methods illustrated in FIG. 5, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for a sensing coordination device associated with a plurality of wireless sensing devices that include a first wireless sensing device, the method comprising:

determining a threshold value for the first wireless sensing device, wherein the threshold value is for comparison with a difference between channel estimates of wireless sensing measurements of the first wireless sensing device;

causing application of the threshold value in control of operation of the first wireless sensing device for performing wireless sensing measurements; and causing pre-allocation of radio resources for wireless sensing measurement reports, wherein a number of pre-allocated radio resources is less than a number of radio resources needed for wireless sensing measurement reports from all the wireless sensing devices associated with the sensing coordination device.

2. The method of claim 1, wherein causing application of the threshold value comprises transmitting an indication of the threshold value to the first wireless sensing device.

3. The method of claim 1, wherein the difference between channel estimates of wireless sensing measurements quantifies one or more of the following:

a variation between two consecutive channel estimates; and a number of differing channel estimates during a time interval.

4. The method of claim 1, wherein determining the threshold value for the first wireless sensing device comprises dynamically adjusting the threshold value over time.

5. The method of claim 1, wherein the threshold value for the first wireless sensing device is a dedicated threshold value for the first wireless sensing device.

6. The method of claim 1, wherein the threshold value for the first wireless sensing device is determined based on a type of movement targeted by the wireless sensing measurements of the first wireless sensing device.

7. The method of claim 1, wherein the threshold value for the first wireless sensing device is determined based on a number of wireless sensing devices in the plurality of wireless sensing devices associated with the sensing coordination device.

8. The method of claim 1, wherein the threshold value for the first wireless sensing device is determined based on an impact on a wireless sensing result that the wireless sensing measurements of the first wireless sensing device have.

9. The method of claim 1, wherein determining the threshold value for the first wireless sensing device is triggered by a second wireless sensing device included in the plurality of wireless sensing devices associated with the sensing coordination device.

10. The method of claim 1, wherein causing application of the threshold value in control of operation of the first wireless sensing device comprises causing the first wireless sensing device to refrain from reporting the wireless sensing measurements when the difference between channel estimates of the wireless sensing measurements is less than the threshold value.

11. A method for a first wireless sensing device associated with a sensing coordination device, wherein the sensing coordination device is associated with a plurality of wireless sensing devices that include the first wireless sensing device, the method comprising:

acquiring a threshold value determined by the sensing coordination device for the first wireless sensing device, wherein the threshold value is for comparison with a difference between channel estimates of wireless sensing measurements of the first wireless sensing device; and operating the first wireless sensing device based on the threshold value, wherein:

operating the first wireless sensing device based on the threshold value comprises reporting the wireless sensing measurements of the first wireless sensing device to the sensing coordination device on a number of pre-allocated radio resources, and the number of pre-allocated radio resources is less than a number of radio resources needed for wireless sensing measurement reports from all the wireless sensing devices associated with the sensing coordination device.

12. The method of claim 11, wherein the difference between channel estimates of wireless sensing measurements quantifies one or more of the following:

a variation between two consecutive channel estimates; and a number of differing channel estimates during a time interval.

13. The method of claim 11, wherein operating the first wireless sensing device based on the threshold value further comprises refraining from reporting the wireless sensing measurements when the difference between channel estimates of the wireless sensing measurements is less than the threshold value.

14. An apparatus for a sensing coordination device configured for association with a plurality of wireless sensing devices that include a first wireless sensing device, the apparatus comprising controlling circuitry configured to:

cause determination of a threshold value for the first wireless sensing device, wherein the threshold value is for comparison with a difference between channel estimates of wireless sensing measurements of the first wireless sensing device;

cause application of the threshold value in control of operation of the first wireless sensing device for performing wireless sensing measurements; and cause pre-allocation of radio resources for wireless sensing measurement reports, wherein a number of pre-allocated radio resources is less than a number of radio resources needed for wireless sensing measurement reports from all the wireless sensing devices associated with the sensing coordination device.

15. The apparatus of claim 14, wherein the controlling circuitry is configured to cause application of the threshold value by causing transmission of an indication of the threshold value to the first wireless sensing device.

16. The apparatus of claim 14, wherein the difference between channel estimates of wireless sensing measurements quantifies one or more of the following:

a variation between two consecutive channel estimates; and a number of differing channel estimates during a time interval.

17. The apparatus of claim 14, wherein the controlling circuitry is configured to cause determination of the threshold value for the first wireless sensing device based on causing dynamic adjustment of the threshold value over time.

18. The apparatus of claim 14, wherein the controlling circuitry is configured to cause determination of the threshold value for the first wireless sensing device based on causing determination of a dedicated threshold value for the first wireless sensing device.

19. The apparatus of claim 14, wherein the controlling circuitry is configured to cause determination of the threshold value for the first wireless sensing device based on a type of movement targeted by the wireless sensing measurements of the first wireless sensing device.

20. The apparatus of claim 14, wherein the controlling circuitry is configured to cause determination of the threshold value for the first wireless sensing device based on a number of wireless sensing devices in the plurality of wireless sensing devices associated with the sensing coordination device.

21. The apparatus of claim 14, wherein the controlling circuitry is configured to cause determination of the threshold value for the first wireless sensing device based on an impact on a wireless sensing result that the wireless sensing measurements of the first wireless sensing device have.

22. The apparatus of claim 14, wherein the controlling circuitry is configured to cause the determination of the threshold value for the first wireless sensing device responsive to triggering by a second wireless sensing device included in the plurality of wireless sensing devices associated with the sensing coordination device.

23. The apparatus of claim 14, wherein the controlling circuitry is configured to cause application of the threshold value based on causing the first wireless sensing device to refrain from reporting the wireless sensing measurements responsive to the difference between channel estimates of the wireless sensing measurements being less than the threshold value.

24. An apparatus for a first wireless sensing device configured for association with a sensing coordination device, wherein the sensing coordination device is associated with a plurality of wireless sensing devices comprising the first wireless sensing device, the apparatus comprising controlling circuitry configured to:

cause acquisition of a threshold value determined by the sensing coordination device for the first wireless sensing device, wherein the threshold value is for comparison with a difference between channel estimates of wireless sensing measurements of the first wireless sensing device; and cause operation of the first wireless sensing device based on the threshold value, wherein:

operation of the first wireless sensing device based on the threshold value comprises reporting the wireless sensing measurements of the first wireless sensing device to the sensing coordination device on a number of pre-allocated radio resources, and the number of pre-allocated radio resources is less than a number of radio resources needed for wireless sensing measurement reports from all the wireless sensing devices associated with the sensing coordination device.

25. The apparatus of claim 24, wherein the difference between channel estimates of wireless sensing measurements quantifies one or more of the following:

a variation between two consecutive channel estimates; and a number of differing channel estimates during a time interval.

26. The apparatus of claim 24, wherein the controlling circuitry is configured to cause operation of the first wireless sensing device based on the threshold value by causing the first wireless sensing device to refrain from reporting the wireless sensing measurements responsive to the difference between channel estimates of the wireless sensing measurements being less than the threshold value.

* * * * *